June 11, 1957  W. R. ROYALL, JR  2,795,019
REFRIGERATOR SEALING GASKET
Filed Nov. 9, 1953
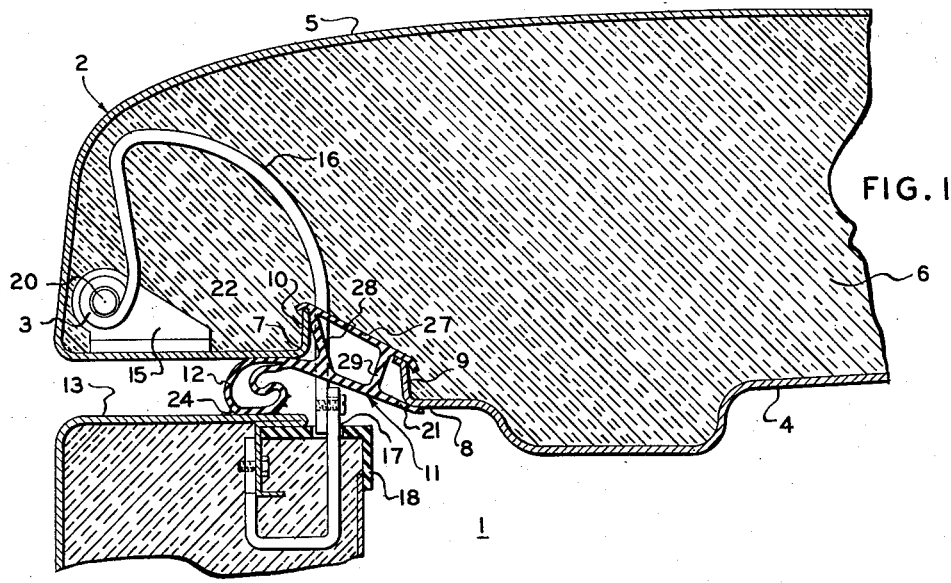
FIG. 1
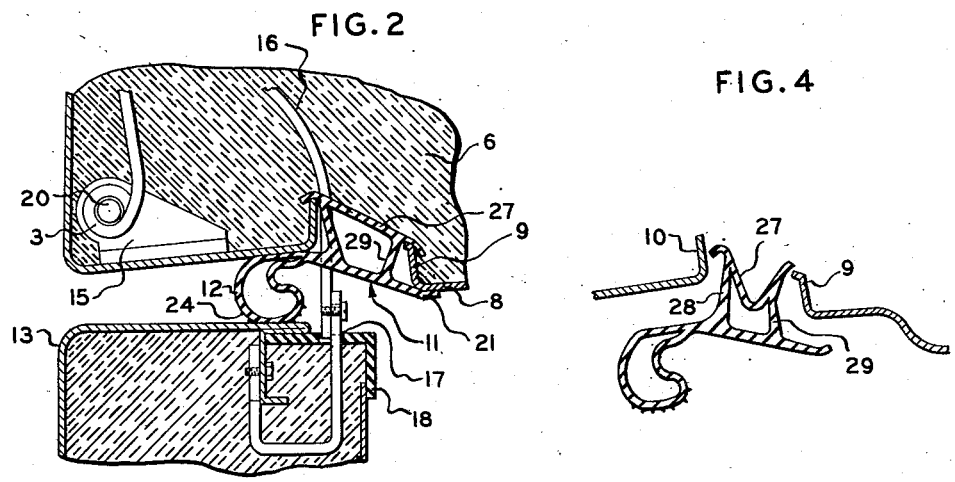
FIG. 2
FIG. 4
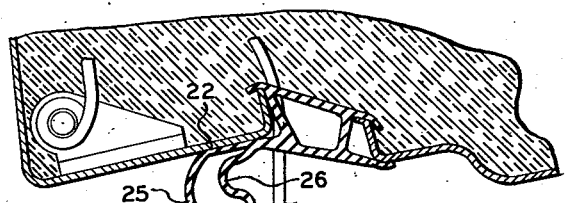
FIG. 3
INVENTOR.
WILLIAM R. ROYALL, JR.
BY
HIS ATTORNEY United States Patent Office 2,795,019
Patented June 11, 1957

2,795,019

REFRIGERATOR SEALING GASKET

William R. Royall, Jr., Erie, Pa., assignor to General Electric Company, a corporation of New York Application November 9, 1953, Serial No. 391,093

1 Claim. (Cl. 20—69)

The present invention relates to a refrigerator sealing gasket for refrigerator cabinets and the like. More particularly, it is concerned with an improved gasket for effectively sealing the door of a refrigerator cabinet which is hinged to the cabinet in such a manner that during closing of the door the gasket is subjected to forces parallel to or at an acute angle with the gasket supporting surfaces.

The usual gaskets employed for sealing the doors in refrigerator cabinets are designed with striking beads adapted to operate under forces which are subtantially perpendicular or normal to the gasket and gasket backing surfaces. Such gaskets are frequently of an oval or arcuate cross section with their major axis lying in the same plane as the hinge pin forming part of the hinge structure securing the door to the cabinet. However, such gaskets are not suitable for use on cabinets equipped with a so-called pivot hinge, that is, a hinge having a pin axis considerably offset from the plane of the gasket or, in other words, the plane of the gasket supporting surfaces. With the pivot hinge there is always present a certain amount of gasket scrubbing or rubbing, that is, a movement of the gasket striking surface along the outer surface of the cabinet when the door is being closed. This is due to the fact that, as the door approaches the closed position, the pivot-type hinge causes the door to move sideways or laterally with regard to the cabinet face structure with the result that the gasket is rubbed along the contacting cabinet surface causing a wearing-away of the gasket as well as unsightly marks on the cabinet surface. This rubbing or scrubbing action is particularly prevalent in the section of the gasket adjacent the hinge side of the door, where with the ordinary offset or pivot-type hinge, the sideways travel may approach 50% of the perpendicular movement as the door is closed through the last few degrees.

An object of the present invention is to provide an improved gasket which will minimize this scrubbing action and yet maintain a good seal between the door and the cabinet. A further object of the invention is to provide a gasket so constructed and arranged that once it has been brought into contact with the mating cabinet surface during closing of the door, it will maintain a rolling rather than a scrubbing contact therewith.

Other objects and advantages of the invention will become apparent as the following description proceeds, and the features of novelty which characterize the present invention will be pointed out with particularity in the claim annexed to and forming a part of this specification.

In carrying out the objects of the invention, there is provided a gasket comprising an anchoring or base portion for securing the gasket to a surface of the cabinet or door and a tubular striking bead of reniform cross section so constructed and arranged that in its uncompressed state its major axis normally extends substantially perpendicularly to the surfaces to be sealed. The gasket bead includes flexible convex and concave side wall portions so that the lateral movement of the surfaces relative to one another during operation of the door will result in a rolling of the gasket bead over the surface in contact therewith rather than the rubbing or sliding action. In a preferred form of the invention there is also provided anchoring or mounting means for securing the gasket on its supporting cabinet member which means functions also as a breaker strip between the inner and outer walls of that member.

For a better understanding of the invention, reference may be had to the accompanying drawing in which:

Fig. 1 is a fragmentary view in section of a portion of a refrigerator cabinet embodying the invention, the door of the cabinet being shown in a closed position;

Fig. 2 is a view similar to Fig. 1 with the door in a partially-opened position;

Fig. 3 is a view similar to Fig. 1 with the door opened to a position where the gasket is no longer in contact with the cabinet surface; and Fig. 4 illustrates the manner in which the gasket is mounted on the door.

While it is obvious that the gasket structure may be secured either to the door or to the cabinet, the most common practice is to mount the gasket on the door structure; and the present invention will therefore be described in connection with such practice.

Referring to the drawing, there is shown a refrigerator cabinet including a storage compartment 1 having an access opening adapted to be closed by a door 2 hinged to the storage compartment 1 adjacent the front thereof by means of a hinge 3. The door comprises spaced inner and outer walls 4 and 5 between which there is contained a suitable heat-insulating material 6. The outer door wall 5 includes a marginal portion 7 extending inwardly towards the peripheral edge portion 8 of the inner door wall 4. There is also provided an inwardly extending flange 9 on the peripheral or marginal edge 8 of the inner door wall and a similar inwardly extending flange 10 on the marginal portion 7. The gasket 11 of the present invention is anchored between these flanges and includes a resilient striking bead 12 of rubber or the like adapted to seal the opening between the surface of marginal portion 7 of the outer door and the face portion 13 forming the part of the outer wall of the storage compartment 14 surrounding the access opening.

One leaf 15 of the concealed-type pivot hinge 3 is secured to the inner surface of the marginal portion 7 while the other leaf 16 of somewhat U-shaped cross section extends outwardly through the opening between flanges 9 and 10 and into the walls defining storage space 1 through an aperture 17 in the breaker's strip 18. The storage compartment end of the hinge is secured to the inner surface of the marginal portion 13.

With such a construction, it will be noted that the hinge pin 20 is substantially offset from the plane of the marginal portion 13 of the storage compartment wall so that there is a substantial movement from right to left of the marginal portion 7 of the door structure relative to marginal section 13 as the door is moved from a partially open position as in Fig. 3 to the closed position of Fig. 1. This same relative movement applies also to any fixtures integrally connected to either of the marginal sections 7 or 13 such as the gasket 11 and its bead 12 which are fixed to the inner door surface.

With the usual gaskets not specifically designed for use in structures in which the hinge pin 20 is offset from the plane of the cabinet face defined by marginal section 13, such sideways movement will result in a substantial rubbing of the gasket along the surface 13 as the door moves through the last few degrees to its closed position. Such gaskets will also tend to bind or grab at certain sections along their length with a resultant buckling of the bead. This increases the likelihood of the door being sprung by the greater pressure exerted by the buckled portion of the gasket. Also under such conditions, the remaining sections of the gasket may not be in effective sealing relationship with the cabinet structure.

These disadvantages of the known gasket seals are avoided in accordance with the present invention by providing a striking bead 12 so constructed and arranged that it does not rub over the surface of the marginal section 13 during closure of the door so that no buckling action is possible and the gasket will remain in sealing relationship between the marginal surfaces 7 and 13 regardless of slight variations in the distances between these two surfaces.

The gasket 11 comprises a relatively flat base portion 21 in contact with the inner surface of the door 2 with the resilient striking bead 12 formed integrally with the base portion along one edge thereof. The bead 12 comprises a bearing portion 22 in contact with the marginal surface 7 and is generally of a reniform or kidney-shaped cross section. To increase its flexibility, it is of a hollow or tubular cross section or form with the striking surface 24 of the bead extending outwardly from the bearing portion 22. In other words, in the uncompressed state the major axis of the striking bead extends substantially from the bearing portion 22 to the striking surface 24 and is substantially normal or perpendicular to the plane of the marginal edge 7 against which the bearing portion 22 rests. The intermediate portions of the striking bead between the bearing surface 22 and the striking surface 24 are curved or arcuate to give the striking bead a generally kidney-shaped cross section. The outer convex intermediate portion 25 has a substantially larger radius of curvature than the inner concave intermediate portion 26 with the result that when pressure is applied to the striking bead as the striking surface 24 comes in contact with the marginal surface 13, the intermediate portions 25 and 26 fold together with the concave portion 26 enclosed by the opposite wall portion of the gasket as is shown more clearly in Figures 1 and 2 of the drawing.

The entire wall structure of the striking bead 12 is sufficiently thin and flexible to permit not only this folding action but also a rolling action of the bead during the sideways or lateral movement of the door relative to the marginal surface 13 from the time the gasket first contacts the marginal surface 13 and the time when the door is completely closed. In other words, once the striking bead has contacted the marginal surface 13 it tends to stay in non-rubbing contact with that surface rather than to slide across an area thereof. If desired, longitudinal ridges 23 may be provided to aid in maintaining original point of contact between the gasket and its mating surface. As a result, the sideways movement of the door relative to the marginal surface 13 is absorbed by the rolling tendency of the gasket bead. This rolling action or tendency of the gasket which is in a counter-clockwise direction as viewed in the drawing is offset somewhat, however, by the fact that as the door moves from the position shown in Fig. 3 to that shown in Fig. 1 the bead 12 is compressed between the door and cabinet with the result that the specific point on the striking surface 24 which first contacts the marginal surface 13 remains in contact therewith and more of the gasket surface engages surface 13 due to the shortening of the major axis of the striking bead 12. Also, any tendency for the bearing surface 22 to raise from its contact with the marginal surface 7 is counteracted by this foreshortening of the major axis of the gasket bead 12 so that the bearing surface 22 at all times remains in sealing contact with the marginal surface 7. As shown in Figs. 1, 2, and 3, it will be noted that the major axis of the striking bead 12 is maintained substantially perpendicular to the plane of the bearing portion 22 throughout this closing.

While various means may be employed for securing the base portion 21 to the inner surface of the door structure, a preferred arrangement includes a resilient hollow dovetailed section integral with the base portion 21, which dovetailed section effectively cooperates with the flanged portions 9 and 10 to hold the gasket in position on the door structure. The dovetailed section includes a retainer strip 27 spaced from the base portion 21 and overlapping the inner edges of the flanges 9 and 10 and two resilient diverging connecting portions 28 and 29 joining the base strip 21 to the retainer strip 27. These connecting portions preferably join the retainer strip intermediate the edges thereof which overlap the flanges 9 and 10.

This construction of the anchoring portion of the gasket facilitates the mounting of the gasket on the door structure. With the inner panel 4 of the door connected to the outer wall 5, for example, at the four corners of the door by means of angle braces (not shown), the gasket 11 is mounted on the door by flexing the retainer strip 27 downwardly into the space between the cross of connecting portions 28 and 29 as shown in Fig. 4 after which the side edges of the retainer strip are inserted between the flanges 9 and 10. A relatively slight pressure applied to the base portion 21 then forces the dovetailed section of the gasket inwardly between the flanges 9 and 10 so that the retainer strip 27 can return to its normal position with the edges thereof overlapping the free edges of the flanges 9 and 10.

The operation of the present invention has been particularly described with reference to the hinged side of the door. However, it is obvious that excellent sealing of the cabinet is also obtained by means of the present gasket on the remaining areas of the door. For example, on the lock side of the door (not shown) the effect of the offset or pivot hinge on the relative movement of the door relative to the cabinet structure is substantially less so that the gasket action is primarily determined only by compressive forces perpendicular to the surfaces corresponding to marginal surfaces 7 and 13.

While specific embodiments of this invention have been shown and described, it is not desired that the invention be limited to the particular construction shown and described, and it is intended by the appended claim, to cover all modifications within the spirit and scope of the invention.

A sealing gasket for a refrigerator comprising a cabinet member and a door member, said gasket being composed of resilient material and including a tubular striking bead including a flat bearing portion adapted to engage a surface of one of said members and a striking portion to engage the other of said members in sealing relationship, said striking bead normally having a kidney-shaped cross section having a major axis thereof extending from said bearing portion and remaining substantially perpendicular to the plane of said bearing portion throughout the entire range of contact between one of said members and said striking portion so that relative lateral movement of said members to a closed position will result in a rolling and non-rubbing movement of said striking portion, said bead assuming a U-shaped cross section when said bead is compressed between said members.

References Cited in the file of this patent

UNITED STATES PATENTS

| | | |
|---|---|---|
| 2,051,757 | Travis | Aug. 18, 1936 |
| 2,607,091 | Dodge | Aug. 19, 1952 |
| 2,665,456 | Morton | Jan. 12, 1954 |

FOREIGN PATENTS

| | | |
|---|---|---|
| 617,595 | Great Britain | Feb. 9, 1949 |